United States Patent [19]
Flint

[11] 4,066,349
[45] Jan. 3, 1978

[54] INFORMATION RETRIEVAL SYSTEM HAVING RAMP MOTOR CONTROL

[75] Inventor: John R. Flint, Barrington, Ill.

[73] Assignee: Bell & Howell Company, Chicago, Ill.

[21] Appl. No.: 728,674

[22] Filed: Oct. 1, 1976

[51] Int. Cl.² .................. G06F 13/04; B65H 23/18
[52] U.S. Cl. ........................ 353/25; 226/33; 360/72
[58] Field of Search .............. 360/72, 74, 73, 49; 353/25, 26; 226/9, 33

[56] References Cited

U.S. PATENT DOCUMENTS

| 3,727,203 | 4/1973 | Grossman | 360/72 |
| 3,736,565 | 5/1973 | Sidline | 360/72 |
| 3,809,302 | 5/1974 | Malyon | 360/72 |
| 3,926,513 | 12/1975 | Silver et al. | 353/25 |

*Primary Examiner*—Vincent P. Canney
*Attorney, Agent, or Firm*—Robert A. Walsh

[57] ABSTRACT

The disclosure relates to a scanning means for use in an information retrieval system for locating a preselected information bearing element out of a plurality of information bearing elements which are consecutively numbered for identification. The scanning means includes a ramp generator which generates a ramp voltage, drive means for driving the information bearing elements in first and second directions at a rate substantially proportional to the magnitude of the ramp voltage, sensing means for sensing the elements as they are driven, means for causing the drive means to drive the information bearing elements in the first or second direction towards the selected element, means for resetting the ramp generator when the drive means drives the selected element past the sensing means and disabling means for disabling the ramp generator when the selected information bearing element has been located.

9 Claims, 6 Drawing Figures

INFORMATION RETRIEVAL SYSTEM HAVING RAMP MOTOR CONTROL

BACKGROUND OF THE INVENTION

The present invention is generally directed to an information retrieval system of the type which automatically retrieves selected information bearing elements for inspection. The present invention is more particularly directed to an improved scanning means with ramp speed control for an automatic film searching and retrieval system for use with film having a plurality of consecutively numbered frames, and wherein each frame includes an information image and an adjacent frame marker.

Information retrieval systems are well known. One efficient type of retrieval system that has found widespread acceptance is often referred to as a microfilm retrieval system. In such systems, copies of documents and/or data are recorded on film such as 16 mm film wherein each film frame comprises an information bearing element. With the size of the film frame being on the order of 1 mm per document inch, such size reduction affords a substantial reduction in information storage volume and greatly simplifies handling of the information. Such a reduction in size necessarily precludes direct reading of the information bearing elements or film frames and the usual procedure for reading them is to project the film frame images onto a screen and to magnify them to a size corresponding approximately to the original size of the information document that is recorded.

Because literally thousands of information bearing elements or film frames comprise a roll of microfilm, searching for a particular image film frame can be time consuming. As an example, microfilm reels are known to include information bearing elements or frames on the order of 40,000 frames per reel. To provide ready access to a preselected information bearing element or film frame, automatic search techniques have been developed in the form of automatic retrieval systems.

In such systems, the film frames of the microfilm reels are numbered consecutively for identification and each film frame has an adjacent marker which may be sensed so that as the film frames are scanned they may be counted and the identification numbers displayed. Hence, during the scan cycle, the counter provides the current number of the film frame currently being sensed and at the end of a scan cycle, provides the current number of the film frame being inspected.

Retrieval systems also include a means for entering a target number which identifies the film frame to be inspected. Suitable logic control within the retrieval systems determines from the current number and the target number whether the film is to be driven in an up direction or a down direction to arrive at the preselected film frame to be inspected.

Scanning systems of the prior art have utilized various techniques for stopping the film when the preselected film frame has been located. Such techniques have included film handling apparatus which move the film at a relatively low rate of speed when searching for a preselected film frame to avoid breakage of the film when it is stopped. Other systems have utilized high speed motors for driving the film at high speed and means for detecting when the preselected image frame is a given number of frames away from the currently sensed frame to switch over to a low speed motor for driving the film at low speed for a predetermined number of frames until the selected film frame is located.

Unfortunately, such prior systems have not been totally reliable. Such systems are either slow, or are subject to overshoot, and should overshoot occur, they generally do not include means for compensating for overshoot to reverse direction and arrive at the selected film frame. When such overshoot protection is afforded, such overshoot protection is provided by complex circuitry which is generally expensive compared to the limited use of such protective circuitry.

Lastly, prior systems of the type referred to above, do not afford accurate control for the stopping of the film in relation to the adjacent film marker and the frame marker sensors. As a result, inaccurate counting of the film frames during subsequent searches may occur with consequent searching error.

It is, therefore, an object of the present invention to provide a new and improved scanning means for an information retrieval system which provides the automatic locating of a preselected information bearing element which is capable of driving the information bearing elements at a high rate of speed but yet affording accurate stopping of the information bearing element scan upon the location of the preselected information bearing element.

It is a more particular object of the present invention to provide a scanning means for information retrieval systems which is capable of efficiently locating a preselected information bearing element regardless of the spacing between information bearing elements.

It is a still further object of the present invention to provide a new and improved scanning means for an information retrieval system wherein the system is relatively uncomplicated and yet is capable of utilizing overshoot to its advantage during the search cycle.

SUMMARY OF THE INVENTION

The invention provides a new and improved scanning means for locating a preselected information bearing element for use in an information retrieval system of the type which locates preselected information bearing elements for inspection, wherein the information bearing elements are consecutively numbered for identification and wherein the system includes a storage means for storing the identification number of the selected information bearing element to be inspected as a target number, a sensor for sensing the information bearing elements, and a counter for providing the identification number of the information bearing element currently being sensed as a current number. The scanning means comprises a comparator coupled to the storage means and to the counter for comparing the current number to the target number and for providing responsive to the comparison a first signal when the target number is greater than the current number and a second signal when the target number is less than the current number. The scanning means also includes drive means for driving the information bearing elements, drive direction control means coupled to the comparator and to the drive means for causing the drive means to drive the information bearing elements in the first direction responsive to the first signal and the second direction responsive to the second signal, a ramp generator for providing a ramp voltage, the drive means being coupled to the ramp generator for driving the information bearing elements at a rate substantially proportional to the ramp voltage, detecting means coupled to the comparator and responsive to a change in the level of the first and second signals for providing the control signal, ramp generator reset means coupled to the detecting means and to the ramp generator for resetting the ramp generator responsive to the control signal, and disabling means coupled to the sensor for detecting when the preselected information element is aligned with the sensor for a predetermined period of time to thereby detect when the preselected information bearing element has been located and for disabling the ramp generator responsive to such detection.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals identify like elements, and in which:

DESCRIPTION OF THE PREFERRED EMBODIMENT

Figure 1:
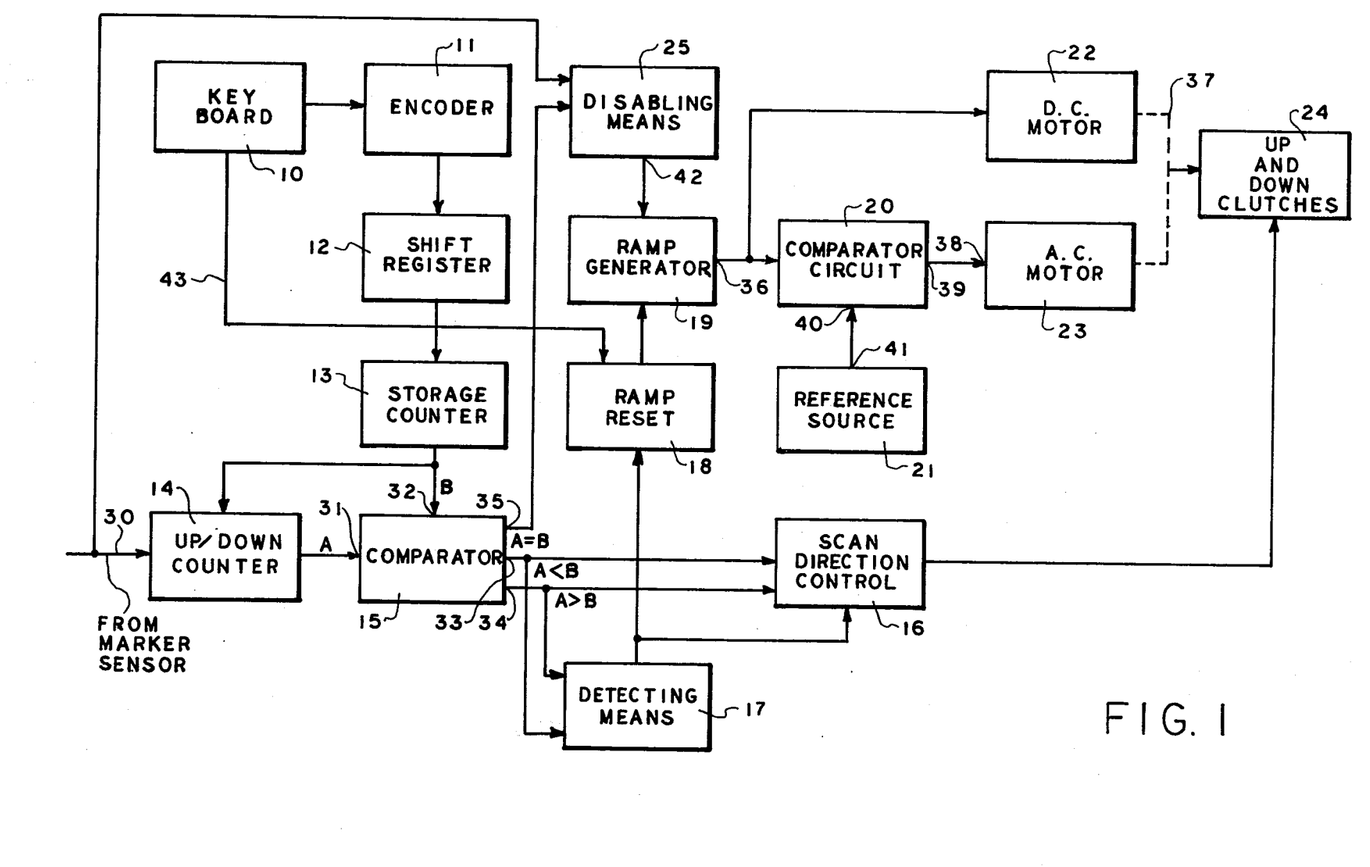
FIG. 1 is a block diagram of an information retrieval system embodying the present invention.

Referring now to FIG. 1, the information retrieval system there shown includes a keyboard 10, an encoder 11, a shift register 12, a storage counter 13, an up/down counter 14, a comparator 15, a scan direction control 16, a detecting means 17, a ramp reset 18, a ramp generator 19, a comparator circuit 20, a reference source 21, a drive means comprising D.C. motor 22 and A.C. motor 23, a drive direction control comprising up and down clutches 24, and a disabling means 25. As described herein, the preferred embodiment will be related to a microfilm retrieval system wherein the image bearing elements are in the form of microfilm frames.

Keyboard 10 includes a plurality of keys which are pressed to indicate the number of the selected film frame to be inspected. Keyboard 10 is coupled to encoder 11 which transforms the decimal film frame identification number to be inspected into binary coded decimal digits. Encoder 11 is coupled to shift register 12 and shift register 12 is coupled to the storage counter 13. Shift register 12 shifts the binary coded decimal digits representing the identification number of the selected film frame to be inspected into the storage counter 13.

Up/down counter 14 has an input coupled to a film frame marker sensor by lines 30. Each film frame includes an adjacent marker to thereby allow the film frames to be counted as they are scanned. The film frame markers and film frame marker sensors may be constructed in a manner fully taught by U.S. Pat. No. 3,941,978, which issued Mar. 2, 1976, in the names of James E. Huston and Robert W. Murre, which patent is assigned to the assignee of the present invention. As taught in that patent, each film frame includes a marker window which operates in association with a pair of light pipes. The light projected through the light pipes is detected by a pair of photo sensors which generate an output responsive to the light being sent. As a result, a first wave form is provided when the film is scanned in a first direction and a second wave form is provided when the film is scanned in a second direction. As a result, the film frames are not only sensed for counting, but additionally the direction in which the film is being scanned is discernible so that the up/down counter 14 may count down when the frames are moving in a down direction and count up when the frames are moving in an up direction.

Preferably, each film frame is provided with an identification number. It may be desirable to start a microfilm reel at a film frame number other than 1. To this end, up/down counter 14 is coupled to the storage counter so that it receives the proper starting film frame identification number from which to count.

Comparator 15 has an input 31 coupled to the up/down counter 14 for receiving the film frame identification numbers as they are scanned. As a result, as the film is scanned, comparator 15 is provided at input 31 with the identification number of the film frame currently being scanned and when the film is caused to stop, input 31 will receive the film frame identification number of the film frame currently being inspected. These identification numbers are indicated in FIG. 1 as being "A".

Comparator 15 has another input 32 which is coupled to the storage counter 13. It receives at input 32 the film frame identification number of the selected film frame to be inspected which number is identified by "B". The comparator 15 has a pair of outputs which provide basic information as to which direction the film must be scanned in order to locate the preselected image film frame. To this end, comparator 15 includes outputs 33 and 34. Comparator 15 compares current number "A" and the target number "B" and provides a logical 1 at one of the outputs 33 and 34 in response to that comparison. If the target number "B" is greater than the current number "A", the comparator will provide a logical 1 or first signal at output 33 while output 34 will provide a logical 0. On the other hand, if the current number "A" is greater than the target number "B", comparator 15 will provide a logical 1 or a second signal at output 34 while output 33 will provide a logical 0.

Comparator 15 is coupled to the scan direction control 16 at outputs 33 and 34. The scan direction control 16 in response to the first and second signals will cause the up and down clutches 24 to selectively engage the drive means D.C. motor and A.C. motor which will cause the motors to scan the film frames in a first direction responsive to the first signal and in a second direction responsive to the second signal. Specifically, when the target number "B" is greater than the current number "A", comparator 15 will provide the first signal at output 33 which will cause the scan direction control 16 to cause the up and down clutches 24 to drive the film in the up direction. Conversely, when the current number "A" is greater than the target number "B", the comparator 15 will provide at output 34 the second signal which causes the scan direction control 16 to cause the up and down clutches 24 to drive the film in the down direction.

As thus far described, the system of FIG. 1 operates in a similar manner to microfilm retrieval systems of the prior art such as the microfilm retrieval system fully described in the aforementioned Huston and Murre patent. However, the system of FIG. 1 includes a new and improved scanning means for selectively driving the film in order to locate a preselected image film frame.

Ramp generator 19 provides a ramp voltage at output 36 which is coupled to the D.C. motor 22 and the comparator circuit 20. D.C. motor 22 is selectively engageable with the up and down clutches 24 as indicated by the dashed line 37. As a result, D.C. motor 22 drives the up and down clutches 24 (and as a result the film) at a rate substantially proportional to the magnitude of the ramp voltage provided by the ramp generator 36. Of course, the direction of film drive is determined by the clutch which engages the D.C. motor 22.

A.C. motor 23, when activated, drives the up and down clutches 24 and thus the film at a fixed rate of speed. A.C. motor 23 is activated responsive to comparator circuit 20. Comparator circuit 20 has an input 40 coupled to output 41 of reference source 21. When the magnitude of the ramp voltage reaches a preselected voltage level which is equal to the magnitude of the reference source 21, comparator circuit 20 will provide at output 39 a drive selection control signal which activates the A.C. motor 23 at input 38. Thus, comparator circuit 20 may be thought of as a drive selection means.

A.C. motor 23 is provided for the purposes of driving the film at a high rate of speed. Should the image film frame to be inspected be far enough away from the currently inspected film frame such that the ramp voltage reaches the preselected level, the A.C. motor 23 will be activated by comparator circuit 20 to decrease the search cycle time. Of course, should D.C. motor 22 be capable of driving the film fast enough, the A.C. motor, comparator circuit 20, and reference source 21 may be eliminated.

The ramp reset 18 is coupled to the detecting means 17 and resets ramp generator 19 responsive to the detecting means 17. Detecting means 17 detects when there is a change in the first and second signals and provides a control signal when it detects a change in the levels of the first and second signals. A change in the respective levels of the first and second signals indicates that the selected image film frame has been driven past the marker sensor and reversal of film drive direction is required. Thus, also responsive to the change in the levels of the first and second signals, the scan direction control 16 will cause the up and down clutches to alternate to set the system for film scan in the reverse direction than that previously obtained. Also, at this time, the ramp 18 responsive to the control signals from detecting means 17 resets the ramp generator 19 to cause the D.C. motor, if it is running, to stop or the A.C. motor, if it is running, to stop in a manner to be fully described hereinafter. Suffice it to say here that upon resetting the ramp generator 19, the film drive will be stopped at which time the system is established in the reverse direction, and the ramp voltage is once again generated so that the D.C. motor will drive the film in the reverse direction relative to the previous film drive direction.

Detecting means 17 is also shown coupled to the scan direction control 16. This connection indicates that it may be preferred to have the detecting means 17 to momentarily interrupt the clutch actuation signals from the scan direction control while the ramp generator 19 is being reset. This assures that the ramp generator 19 will be reset prior to the engagement of either the up or down clutches with the D.C. motor.

Disabling means 25 is coupled to the marker sensors to detect when the preselected image film frame is aligned with the sensors for a predetermined period of time. It is also coupled to a third output 35 of comparator 15 which provides a third signal when the current number "A" is equal to the target number "B". Disabling means 25 provides at output 42 a disabling pulse to disable ramp generator 19 to which output 42 is coupled when the third signal is present and when the preselected image film frame is aligned with the sensors for a predetermined period of time. The predetermined time period is determined by the time constant of a time constant circuit within disabling means 25. Thus, disabling means 25 thereby detects when the preselected image film frame has been located and disables the ramp generator for turning off the drive motors when the selected image film frame has been located.

Figure 2:
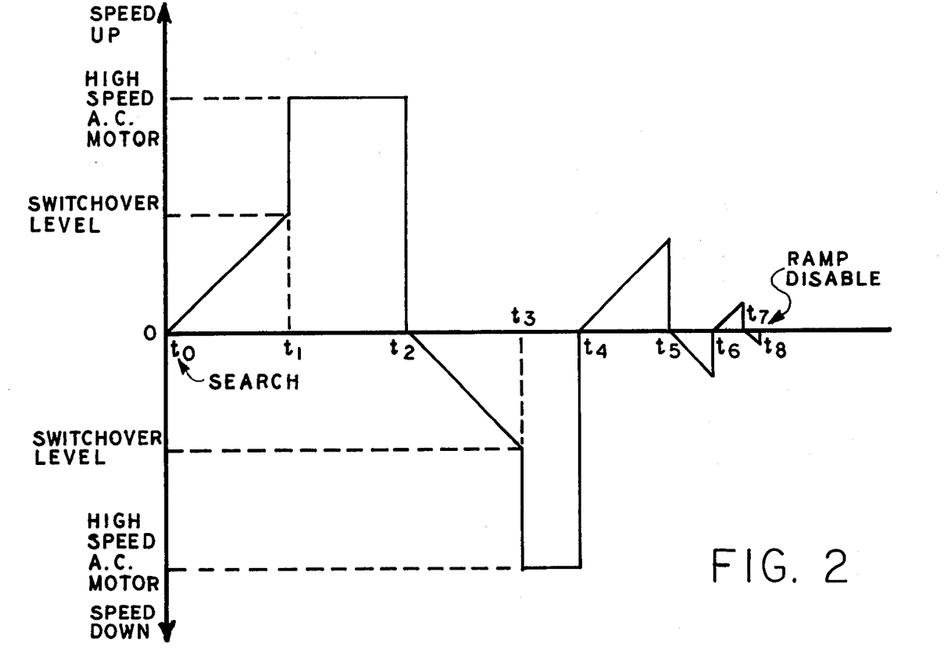
FIG. 2 is a graph showing the information bearing element scan rate and direction as a result of practicing the present invention.

In order to gain a more thorough understanding of the present invention, reference may be made to FIG. 2 which is a graph of the film drive direction and speed which is obtained for locating a preselected image film frame when practicing the present invention. When it is desired to locate a preselected image film frame, the target number identifying the preselected image film frame to be located is entered via keyboard 10. The decimal digits representing the identification number of the preselected image film frame are encoded by encoder 11 into binary digits which are transferred to shift register 12 and to storage counter 13. Storage counter 13 then provides comparator 15 at input 32 with the binary digits representing the identification number of the preselected image film frame which is the target number "B".

Up/down counter 14 has stored therein the binary digits representing the identification number of the last image film frame to be inspected or in other words, the image film frame currently being sensed by the marker sensor. Up/down counter 14 provides comparator 15 at input 31 with the current number "A".

Comparator 15 then compares the target number "B" to the current number "A" and provides either the first or second signal depending upon the relationship of the target and current numbers. Assuming that the target number is greater than the current number, comparator 15 will provide the first signal which includes a logical 1 level at output 33 and a logical 0 level at output 34.

The scan direction control 16 is provided with the first signal and provides the up and down clutches with an up direction control signal engaging the up clutch with the drive motors to ready the retrieval system for scanning the film in the up direction upon the initiation of a search command.

Now that the system is readied, the search command key on keyboard 10 is pressed which provides a signal via line 43 to the ramp reset 18. Ramp reset 18 in response to the search key signal resets ramp generator 19 whereupon the ramp generator 19 begins to generate its ramp voltage. In FIG. 2, the depression of the search key occurs at $t_0$.

As the ramp generator provides its ramp voltage, D.C. motor 22 drives the film in the up direction in association with the up clutch at a rate which is substantially proportional to the magnitude of the ramp generator voltage. When the generator voltage is equal in magnitude to the preselected voltage level provided by reference 21, comparator circuit 20 provides a drive selection signal at output 39 which activates A.C. motor 23. This occurs at $t_1$.

Upon activation of the A.C. motor at $t_1$, the A.C. motor drives the film in the up direction in association with the up clutch at a fixed rate of speed. When the marker associated with the preselected image film frame passes the marker sensor, the current number "A" with now be greater than the target number "B". As a result, comparator 15 will provide the second signal which includes the logical 1 level at output 34 and a logical 0 level at output 33.

Responsive to the change in the levels of the first and second signals, detecting means 17 which is coupled to outputs 33 and 34 of comparator 15 will provide its control signal to ramp reset 18 to cause ramp reset 18 to reset ramp generator 19. Upon being reset the magnitude of the ramp voltage provided by the ramp generator will decrease to 0 and thus be at a magnitude which is less than the preselected level provided by reference source 21. As a result, A.C. motor 23 is caused to be deactivated by comparator circuit 20 and the film drive momentarily stops.

Also responsive to the control signal provided by the detecting means 17, the up and down drive selection signals to the up and down clutches 24 are momentarily inhibited during the reset period of the ramp generator 19. Lastly, the scan direction control 16 also is conditioned for providing at the termination of the inhibit period a down direction selection to the up and down clutches 24 responsive to the second signal to ready the system for driving the film in the reverse or down direction when ramp generator 19 proceeds to provide its ramp voltage. The resetting of ramp generator 19, the inhibiting of the up and down drive selection pulses from scan direction control 16, and the conditioning of the scan direction control 16 for providing the down drive selection signal occurs at $t_2$ as shown in FIG. 2. Now as the D.C. motor accelerates, it drives the film in the down direction in association with the down clutch at a rate substantially proportional to the magnitude of the ramp generator voltage.

At $t_3$ the ramp generator voltage again reaches the preselected level provided by reference source 21 to cause the A.C. motor to be activated. Therefore, the A.C. motor takes over the drive of the film in the down direction and at a substantially fixed rate.

At $t_4$ the marker sensor associated with the preselected image film frame once again passes the marker sensor and overshoots in the down direction to cause another change in the first and second signals. The detecting means 17 detects the change in the levels of the first and second signals and again provides its control voltage for resetting the ramp generator 19. Concurrently, the up and down drive direction signals of scan direction control 16 are inhibited and the scan direction control 16 responsive to the change from the second signal to the first signal provided by comparator 15 will be conditioned for providing the up direction control signal for the up and down clutches 24. Once again, ramp generator 19 provides its ramp voltage and causes the D.C. motor to drive the film in the up direction at a rate substantially proportional to the magnitude of the ramp generator voltage.

At $t_5$ the marker associated with the preselected image film frame again passes the marker sensor and causes the ramp generator to be reset, the scan direction control signal 16 to be inhibited, and the scan direction control 16 to be conditioned for providing the down direction control signal to the up and down clutches 24.

This operation continues through $t_6$ and $t_7$ until $t_8$ when the marker associated with the preselected image film frame is now at the marker sensor, is being driven in the reverse direction, and is aligned with the marker sensor for the predetermined period of time. With these conditions being met, the disabling means provides a disabling pulse to the ramp generator 19. Because the ramp generator is now disabled, neither the D.C. motor nor the A.C. motor will be permitted to drive the film further and the preselected image film frame is now located and ready for inspection.

As can be seen from the graph of FIG. 2, each time a film reversal is required, the preselected image film frame is closer to the marker sensor than it was at the immediately preceding film reversal. Thus, the scanning system of the present invention exhibits the characteristics of a damped position control system for locating a preselected image film frame.

As will be more fully explained hereinafter, it is preferable to disable the ramp generator only when the film is being driven in the reverse direction in order to assure consistency in the film stopping position. Also, D.C. motor 22, comparator 20 and reference source 21 are included to provide for fast film drive which is not generally not available from D.C. motors. However, the D.C. motor 22 may be used alone in practice without departing from the present invention.

Figure 3:
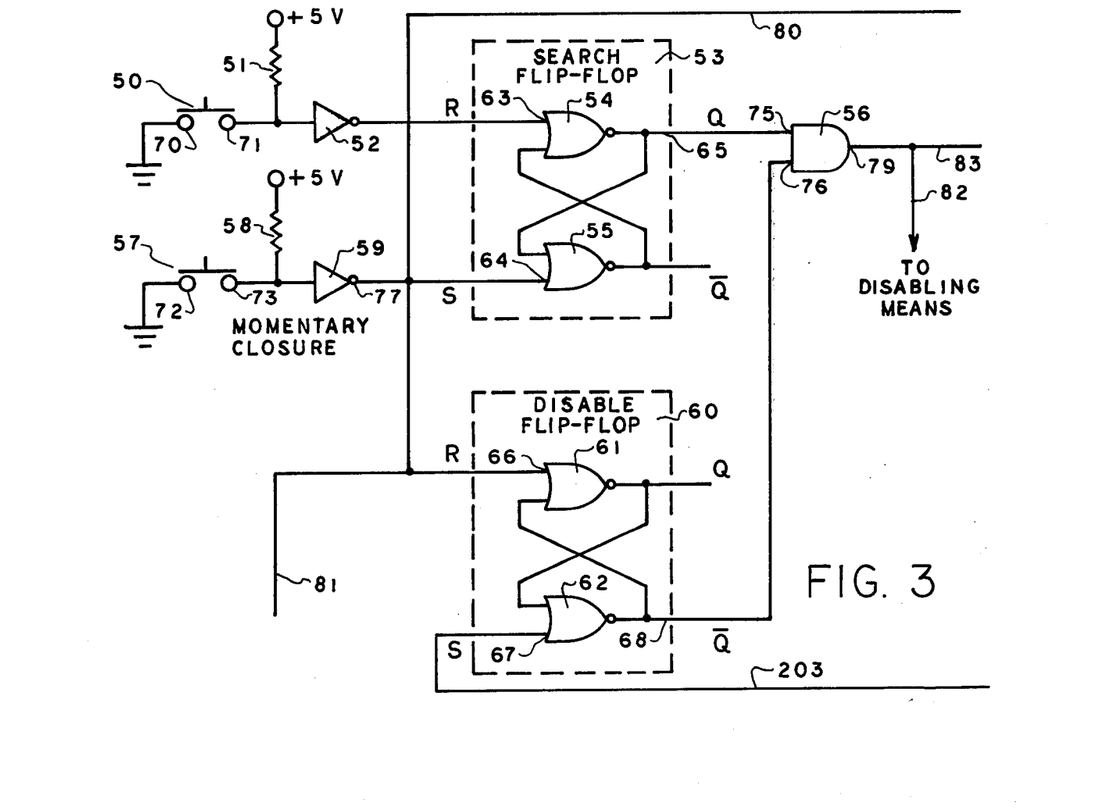
FIG. 3 is a schematic circuit diagram showing a portion of the keyboard and interface circuitry of an information retrieval system embodying the present invention.

Referring now to FIG. 3, the keyboard and interface circuitry there shown includes clear key 50, resistor 51, inverter 52, a search flip-flop 53 comprising NOR gates 54 and 55, a search command AND gate 56, search key 57, resistor 58, inverter 59, and a disable flip-flop 60 comprising NOR gates 61 and 62.

NOR gates 54 and 55 are coupled together in a well known manner forming search flip-flop 53. Flip-flop 53 includes a reset input 63, a set input 64, and a Q output 65. In a like manner, NOR gates 61 and 62 are coupled together to form flip-flop 60 which includes a reset input 66, a set input 67, and a Q output 68.

Clear key 50 has a first terminal 70 coupled to ground and a second terminal 71 coupled to the reset input 63 of flip-flop 53 by inverter 52. In a like manner, search key 57 has a first terminal 72 coupled to ground and a second terminal 73 coupled to the set input 64 of flip-flop 53 by inverter 59. Resistors 51 and 58 are coupled to a plus 5 volt power source for maintaining the input to inverters 52 and 59 at a high level when the clear and search keys are open as shown.

Figure 4:
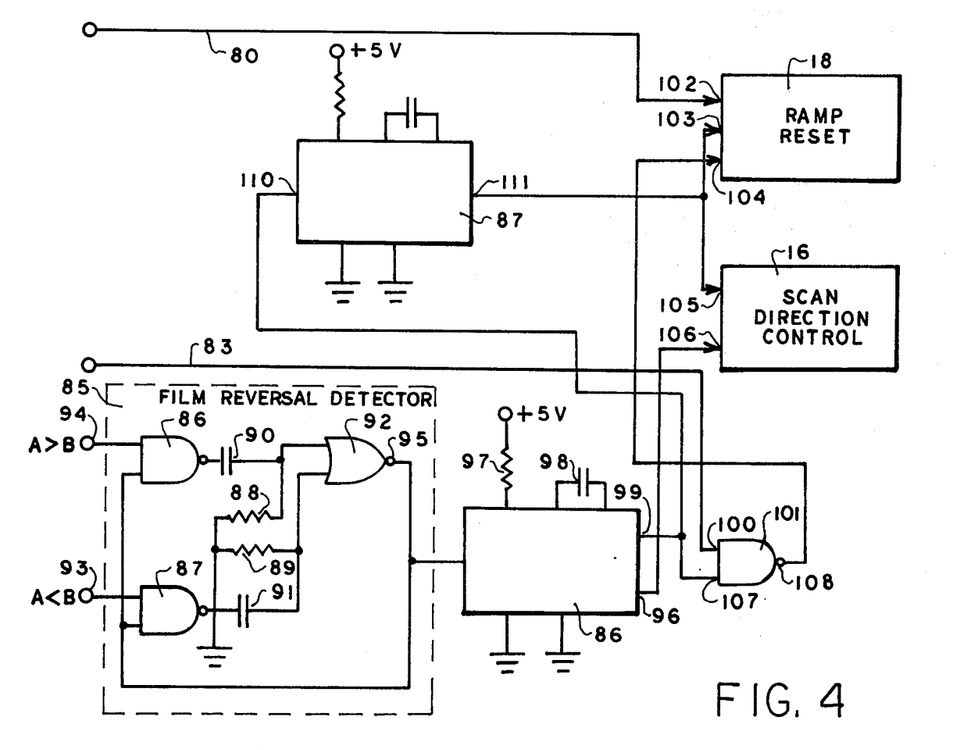
FIG. 4 is a schematic circuit diagram of a detecting means and related circuitry of an information retrieval system embodying the present invention.
Figure 6:
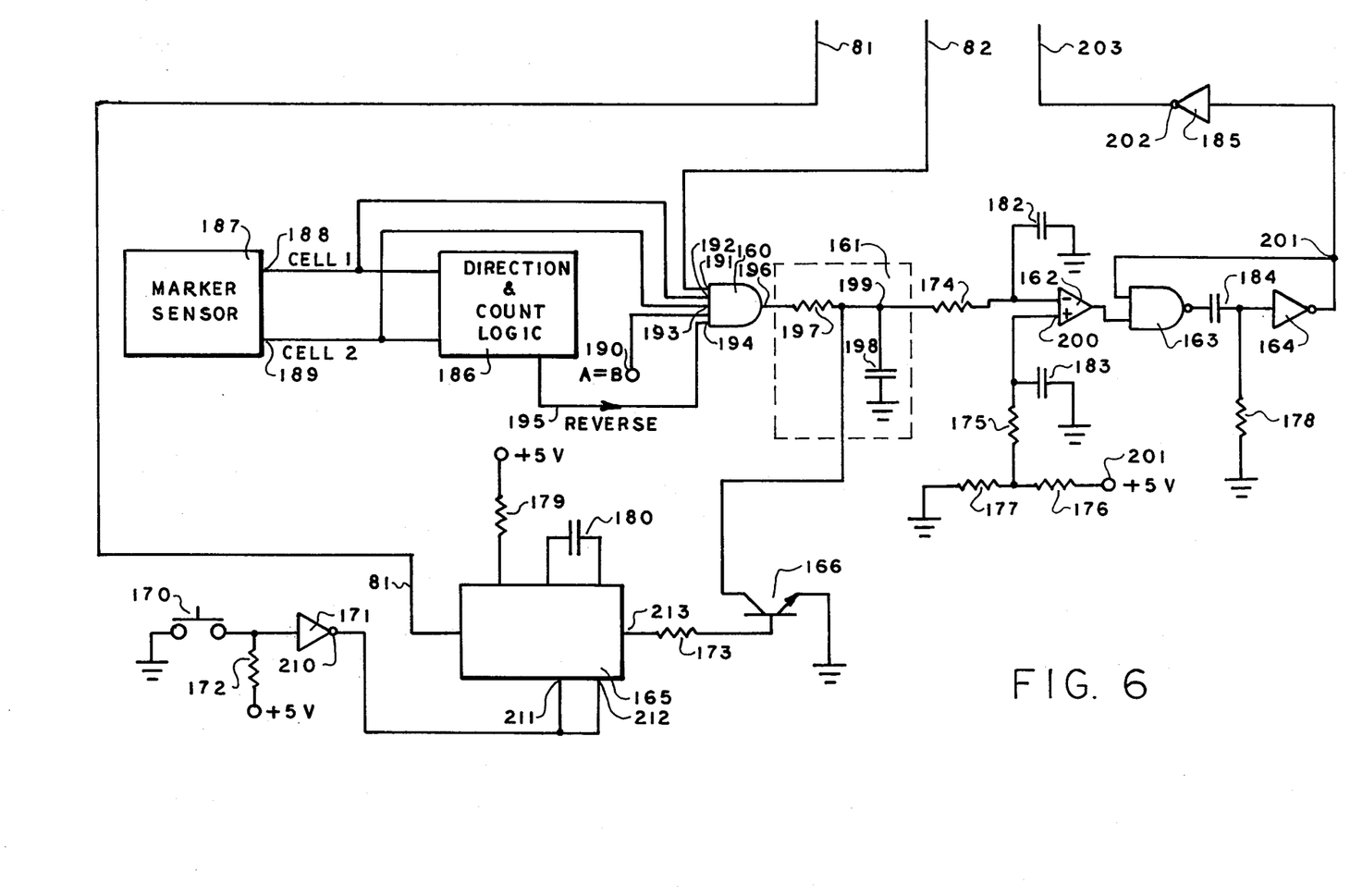
FIG. 6 is a schematic circuit diagram of a disabling means of an information retrieval system embodying the present invention.

Output 65 of flip-flop 53 is coupled to a first input 75 of search command AND gate 56 and output 68 of flip-flop 60 is coupled to a second input 76 of AND gate 56. Output 77 of inverter 59 is additionally coupled to line 80 which is coupled to the ramp reset 18 as shown in FIG. 4. Output 77 is also coupled to reset input 66 of NOR gate 61 and to line 81 which is coupled to the disabling means as shown in FIG. 6. Output 79 of AND gate 56 is coupled to the disabling means (FIG. 6) by line 82 and also to input 100 of NAND gate 101 by line 83 (FIG. 4).

When search key 57 is depressed coupling terminal 73 to ground through terminal 72, inverter 59 will provide at output 77 a logical 1, setting flip-flop 53. Flip-flop 53 will therefore provide at output 65 a high level which is impressed upon input 75 of AND gate 56. Concurrently, the logical 1 at output 77 of inverter 59 will also be impressed upon reset input 66 of flip-flop 60. Flip-flop 60 will therefore provide at output 68 a high level to AND gate 56 at input 76, to thereby cause AND gate 56 to provide a logical 1 at output 79.

As a result of the depression of search key 57, the logical 1 signal will be provided over line 81 to the disabling means to reset the disabling means in a manner to be more fully hereinafter described. Also, logical 1 is provided to line 80 which in turn is impressed upon input 102 of ramp reset 18 to cause the ramp generator to be reset to 0. Lastly, the logical 1 provided at output 79 by AND gate 56 will be impessed upon input 100 of NAND gate 101 to enable ramp reset 18 to reset the ramp generator upon a first reversal condition responsive to NAND gate 101 and the logical 1 on line 82 serves to enable the disabling means of FIG. 6.

FIG. 4 is a detailed schematic circuit diagram of the detecting means 17 of FIG. 1. It includes a film reversal detector 85, a first monostable multivibrator 86, and a second monostable multivibrator 87, such as the commercially available monostable multivibrator 74121. Also shown in FIG. 4 is NAND gate 101 which is utilized by both the detecting means and the disabling means, the ramp reset 18, and the scan direction control 16. In addition to input 102, ramp reset includes inputs 103 and 104. Scan direction control 16 includes up direction control inhibit input 105 and down direction inhibit input 106.

The film reversal detector 85 includes NAND gates 86 and 87, resistors 88 and 89, capacitors 90 and 91, and NOR gate 92 which are coupled together as shown.

The film reversal detector 85 includes input 93 which is coupled to output 33 of comparator 15 (FIG. 1) and input 94 which is coupled to output 34 of comparator 15. Film reversal detector 85 also has an output at the output 95 of NOR gate 92.

The film reversal detector 85 operates in such a manner that it provides at output 95 a momentary logical 1 signal each time the first and second signals at inputs 94 and 93 change in level. For example, when the target number "B" is greater than the current number "A", input 93 will be at a logical 1 and input 94 will be at logical 0 constituting the first signal from the comparator 15. When the target number "B" gets to be less than the current number "A" indicating that the preselected image film frame has passed the sensor, input 94 will change to a logical 1 and input 93 will change to a logical 0. As a result, the film reversal detector 85 will provide at output 95 a momentary logical 1 signal. Conversely, when the preselected image film frame passes the sensor going in the other direction, the first and second signal levels at inputs 93 and 94 will change causing another momentary logical 1 signal to be produced at output 95.

Responsive to the logical 1 signal at output 95, monostable multivibrator 86 will provide at its Q output 96, a short duration logical 1 signal which is impressed upon input 106 of scan direction control 16 to cause the down direction control signal of the scan direction control 16 to be momentarily inhibited for a time period determined by the values of resistor 97 and capacitor 98. At the same time, output 99 of multivibrator 96 will provide a short duration logical 0 which is impressed upon input 107 of NAND gate 101 to provide at output 108 of NAND gate 101 a short duration logical 1 control signal which is in turn impressed upon input 104 of ramp reset 18. The short duration logical 1 control signal at input 104 of ramp reset 18 will cause the ramp generator to be reset.

The trailing edge of the short duration logical 0 signal at output 99 (positive going trailing edge) is coupled to input 110 of monostable multivibrator 87. Responsive to the positive going trailing edge impressed upon input 110, monostable multivibrator provides at output 111 a short duration logical 1 signal which is impressed upon input 103 of ramp reset 18. As a result, two side-by-side positive pulses are impressed upon inputs 104 and 103, to cause ramp reset 18 to reset the ramp generator. The short duration logical 1 signal provided by output 111 is also impressed upon input 105 of the scan direction control 16 to inhibit the up direction control signal momentarily.

Figure 5:
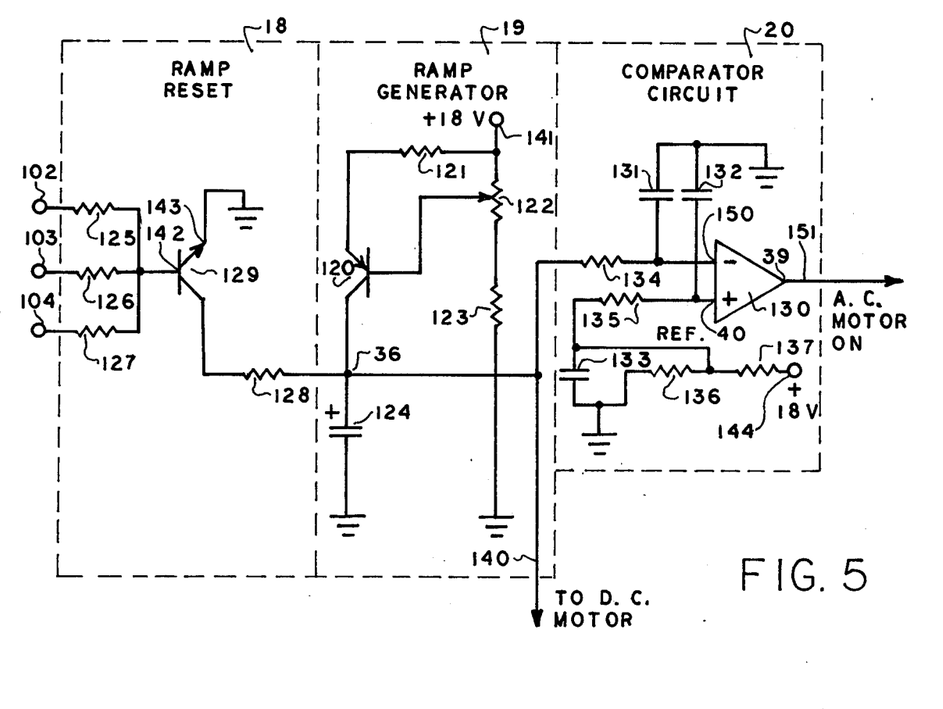
FIG. 5 is a schematic circuit diagram of a ramp reset, ramp generator, and comparator of an information retrieval system embodying the present invention.

Thus, as can be clearly understood from the foregoing, the ramp generator is caused to be reset by ramp reset 18 each time a film reversal is required and when the search key 57 (FIG. 3) is depressed. FIG. 5 shows a detailed schematic circuit diagram of the ramp reset, the ramp generator, and the second comparator which constitutes the drive selection control.

Referring now to FIG. 5, the ramp generator 19 there shown includes a transistor 120, resistors 121, 122, and 123, and capacitor 124. Ramp reset 18 comprises inputs 102, 103, 104, resistors 125, 126, 127, and 128, and transistor 129. Comparator circuit 20 comprises comparator 130, capacitors 131, 132, and 133, and resistors 134, 135, 136, and 137.

Ramp generator 19 has an output 36 which is coupled to the D.C. motor 22 of FIG. 1 by line 140. The components of ramp generator 19 are connected together as shown and to a positive 18 volt power source terminal 141 to provide a ramp voltage at output 36 as capacitor 124 charges. The ramp generator 19 is reset by ramp reset 18 draining the charge off of capacitor 124.

Ramp reset 18 resets ramp generator 19 responsive to a logical 1 input at any one of its inputs 102, 103, or 104. When this occurs, the base 142 of transistor 121 is forward biased which causes the charge on capacitor 124 to be drained through resistor 128, through transistor 129, and to ground connected to emitter 143.

Comparator circuit 20 activates the A.C. motor which is controlled by output 39. The comparator has a power terminal 144 coupled to a positive 18 volt power source which is divided by resistors 137 and 136. The preselected reference voltage level thereby obtained is impressed upon the positive input 40 of comparator 130.

Output 36 of ramp generator 19 is coupled to the negative input 150 of comparator 130 by resistor 134. When the magnitude of the ramp voltage provided at output 36 reaches the level of the reference voltage at input 40, comparator 130 will provide at output 39 a low logic level signal which is impressed upon the A.C. motor by line 151 to activate the A.C. motor. Such activation may be provided in a well known manner such as be declutching the D.C. motor and clutching the A.C. moto or by terminating the ramp voltage from the ramp generator to the D.C. motor and connecting a suitable power source to the A.C. motor for powering it.

Referring now to FIG. 6, it shows the disabling means 25 and includes AND gate 160, time constant circuit 161, comparator 162, NAND gate 163, inverter 164, monostable multivibrator 165, and transistor 166. Also shown in FIG. 6, is a load key 170 which may be incorporated onto the keyboard, an inverter 171, resistors 172, 173, 174, 175, 176, 177, 178, and 179, capacitors 180, 182, 183, and 184, inverter 185, direction and count logic 186 which may form a portion of the up/down counter 14, and the marker sensor 187 having cell outputs 188 and 189.

In order for the disabling means to disable the ramp generator, a number of conditions must be satisfied. First of all, the current number "A" must be equal to the target number "B", and to that end the third output 35 of comparator 15 is coupled to input 190 of AND gate 160 as indicated. Additionally, the search command must have been initiated and to that end line 82 which is shown on FIG. 3 and which has been previously mentioned, is coupled to input 191 of AND gate 160. Also, the marker associated with the preselected image film frame must be aligned with the marker sensor for a predetermined period of time. To that end, the cell outputs 188 and 189 of marker sensor 187 are coupled to inputs 192 and 193 of AND gate 160 respectively. Lastly, in order to assure that the film is accurately and repeatedly stopped in the correct position, AND gate 160 has a last input 194 coupled to the direction and count logic 186 by line 195 to receive information that the film is being driven in the reverse direction.

All of the conditions will be recognized as being satisfied by AND gate 160 except for the condition that the marker associated with the preselected image frame being aligned with the marker sensor for a predetermined period of time. In order to detect this condition, AND gate 160 has an output 196 which is coupled to the time constant circuit 161. Time constant circuit 161 comprises resistor 197 and capacitor 198. When the marker associated with the preselected image film frame is aligned with the marker sensor cells, and if the other conditions required at inputs 191, 190 and 194 are satisfied, AND gate 160 will provide at output 196 a logical 1 signal which is integrated by the time constant circuit 161. When the marker associated with the preselected image film frame is aligned for the predetermined time, the time constant circuit will provide at the junction 199 of resistor 197 and capacitor 198 the voltage of sufficient magnitude to cause comparator 162 to provide a control signal.

Comparator 162 has a positive input 200 which is coupled to a reference source which is provided by the positive 5 volt power source at terminal 201, resistors 176, 177, and resistor 175. When the output voltage of the time constant circuit 161 equals the reference voltage at input 200, comparator 162 will provide a logical 0 output signal which is impressed upon NAND gate 163. NAND gate 163 and inverter 164 comprise a pulse generator which provides a negative going pulse at output 201 which is inverted by inverter 185 to a positive going pulse at output 202. The positive going pulse is applied to line 203 which is coupled to the set input 67 of flip-flop 60 (FIG. 3). As a result, flip-flop 60 will provide at output 68 a logical 0 signal which will cause AND gate 56 to provide a logical 0 signal at output 79. This logical 0 signal at output 79 is impressed upon input 100 of NAND gate 101 (FIG. 4) by line 83. As a result, NAND gate 101 will provide a logical 1 signal indefinitely because flip-flop 60 will not change state until it has been reset by the initiation of a new search.

The logical 1 signal at output 108 thus provided through the disabling means is impressed upon input 104 of the ramp reset (FIG. 4 and FIG. 5). This causes transistor 129 to be forward biased and thus as previously explained, drains the charge from capacitor 124. Unlike the previous situation where the ramp generator was merely reset, the resetting this time due to the disabling means is permanent until the initiation of a new search. Because the ramp generator now provides a 0 volt output, both the D.C. motor and the A.C. motor are unable to run. As a result, the disabling means is coupled to the marker sensor for detecting when the preselected image film frame is aligned with the marker sensor for a predetermined period of time to thereby detect when the preselected image frame has been located and for disabling the ramp generator responsive to such detection.

The disabling means is reset by monostable multivibrator 165 and transistor 166. The resetting is initiated in two different ways. Resetting the disabling means may be accomplished by the depression of load key 170 which grounds the input of inverter 171 to thus provide at output 210 a momentary logical 1 signal at inputs 211 and 212. This causes a momentary logical 1 output at output 213 which forward biases transistor 166 and drains the charge off of capacitor 198.

The disabling means may also be reset when the search key is depressed (see FIG. 3) which causes a logical 1 signal on line 81 which in turn causes a logical 1 output signal at output 213 for a predetermined period of time which forward biases transistor 166 and drains the charge off of capacitor 198.

The present invention provides a new and improved scanning means for information retrieval systems. Overshoot of the preselected information bearing element is accommodated for and in fact is used to advantage in locating the preselected information bearing element. Because the scanning means of the present invention exhibits the characteristics of a damped position control system, the marker associated with the information bearing element may be of any length and may be spaced at random intervals.

While a particular embodiment of the invention has been shown and described, modifications may be made, and it is intended in the appended claims to cover all such modifications which fall within the true spirit and scope of the invention.

I claim:
1. In an information retrieval system of the type which locates preselected information bearing elements for inspection, wherein the information bearing elements are consecutively numbered for identification and wherein the system includes a storage means for storing the identification number of the selected information bearing element to be inspected as a target number, a sensor for sensing the information bearing elements, and a counter for providing the identification number of the information bearing element currently being sensed as a current number, a new and improved scanning means for locating a preselected information bearing element comprising:
  a comparator coupled to the storage means and to the counter for comparing the current number to the target number and for providing responsive to said comparison a first signal when the target number is greater than the current number, and a second signal when the target number is less than the current number;
  drive means for driving said information bearing elements;
  drive direction control means coupled to said comparator and to said drive means for causing said drive means to drive the information bearing elements in the first direction responsive to said first signal and in the second direction responsive to said second signal;

a ramp generator for providing a ramp voltage;

said drive means being coupled to said ramp generator for driving said information bearing elements at a rate substantially proportional to said ramp voltage;

detecting means coupled to said comparator and responsive to a change in the levels of said first and second signals for providing a control signal;

ramp generator reset means coupled to said detecting means and to said ramp generator for resetting said ramp generator responsive to said control signal; and disabling means coupled to the sensor for detecting when the preselected information element is aligned with said sensor for a predetermined period of time to thereby detect when said preselected information bearing element has been located and for disabling said ramp generator responsive to such detection.

2. A scanning means in accordance with claim 1 wherein said drive means comprises a D.C. motor.

3. A scanning means in accordance with claim 2 wherein said drive direction control means comprises first and second clutches, said first and second clutches being selectively actuated responsive to said scan direction control means, said first clutch being operative in association with said D.C. motor to drive the information bearing elements in said first direction and said second clutch being operative in association with said D.C. motor to drive the information bearing elements in said second direction.

4. In an information retrieval system of the type which locates preselected information bearing elements for inspection, wherein the information bearing elements are consecutively numbered for identification and wherein the system includes a register for storing the identification number of the selected information bearing element to be inspected as a target number, a sensor for sensing the information bearing elements, and a counter for providing the identification number of the information bearing element currently being sensed as a current number, a new and improved scanning means for locating a preselected information bearing element comprising:

a comparator coupled to the register and to the counter for comparing the current number to the target number and for providing responsive to said comparison a first signal when the target number is greater than the current number, and a second signal when the target number is less than the current number;

a ramp generator for providing a ramp voltage;

first drive means coupled to said ramp generator for driving the information bearing elements at a rate proportional to the magnitude of said ramp votage;

second drive means for driving the information bearing elements at a substantially fixed rate;

drive direction control means associated with said first and second drive means and responsive to said first and second signals for driving the information bearing elements in a first direction responsive to said first signal and a second direction responsive to said second signal;

drive selection means coupled to said ramp generator and to said second drive means for actuating said second drive means responsive to a preselected ramp voltage level;

detecting means coupled to said comparator and responsive to a change in the levels of said first and second signals for providing a control voltage;

ramp generator reset means coupled to said detecting means and to said ramp generator for resetting said ramp generator responsive to said control signal; and disabling means coupled to the sensor for detecting when the preselected information bearing element is aligned with the sensor for a predetermined period of time to thereby detect when the preselected information bearing element has been located and for disabling said ramp generator responsive to such detection.

5. A scanning means in accordance with claim 4 wherein said first drive means comprises a D.C. motor.

6. A scanning means in accordance with claim 5 wherein said second drive means comprises an A.C. motor.

7. A scanning means in accordance with claim 4 wherein said drive selection means comprises a comparator having a first input coupled to a reference voltage which is equal in magnitude to said preselected voltage level, a second input coupled to said ramp generator, and an output coupled to said second drive means.

8. A scanning means in accordance with claim 4 wherein said drive direction control means comprises first and second clutches, said first and second clutches being selectively actuated responsive to said first and second signals, and first clutch being operative in association with said first and second drive means to drive the information bearing elements in said first direction and said second clutch being operative in association with said first and second drive means to drive the information bearing elements in said second direction.

9. In an information retrieval system of the type for use with film having a plurality of information bearing elements in the form of image frames, wherein the image frames are consecutively numbered for identification with each frame being associated with an identifiable marker, and wherein the system includes a register for storing the identification number of a selected frame to be inspected as a target number, a sensor for sensing the markers, and a counter for providing the identification number of the frame currently being sensed as a current number, a new and improved scanning means for locating a preselected image frame for inspection comprising:

a first comparator coupled to the register and to the counter for comparing the current number to the target number and for providing to said comparison a first signal when the target number is greater than the current number, and a second signal when the target number is less than the current number;

a ramp generator for providing a ramp voltage;

a D.C. motor coupled to said ramp generator for driving the film at a rate substantially proportional to the magnitude of said ramp voltage;

an A.C. motor for driving the film at a substantially fixed rate;

first and second clutches selectively engageable with said D.C. and A.C. motors responsive to said first and second signals to cause the film to be driven in a first direction responsive to said first signal and a second direction responsive to said second signal;

a second comparator having a first input coupled to a reference voltage having a preselected magnitude, a second input coupled to said ramp generator; and an output coupled to said A.C. motor for activating said A.C. motor when said ramp voltage equals said preselected magnitude;

detecting means coupled to said first comparator and responsive to a change in the levels of said first and second signals for providing a control signal;

ramp generator reset means coupled to said detecting means and to said ramp generator for resetting said ramp generator responsive to said control signal; and disabling means coupled to the sensor for detecting when the marker of the preselected image frame is aligned with the sensor for a predetermined period of time to thereby detect when the preselected image frame has been located and for disabling said ramp generator responsive to such detection.

* * * * *